US012725623B2

(12) United States Patent
Nishio

(10) Patent No.: US 12,725,623 B2
(45) Date of Patent: Sep. 1, 2026

(54) VOICE PROCESSING SYSTEM AND VOICE PROCESSING METHOD

(71) Applicant: SHARP KABUSHIKI KAISHA, Sakai City (JP)

(72) Inventor: Tatsuya Nishio, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 245 days.

(21) Appl. No.: 18/421,421

(22) Filed: Jan. 24, 2024

(65) Prior Publication Data

US 2024/0331711 A1 Oct. 3, 2024

(30) Foreign Application Priority Data

Mar. 30, 2023 (JP) ................................ 2023-054673

(51) Int. Cl.
*G10L 21/02* (2013.01)

(52) U.S. Cl.
CPC .................................... *G10L 21/02* (2013.01)

(58) Field of Classification Search
CPC ....................................................... G10L 21/02
See application file for complete search history.

(56) References Cited

U.S. PATENT DOCUMENTS

2017/0155800 A1* 6/2017 Nagasawa .......... H04N 1/00307
2018/0192223 A1* 7/2018 Satheesh ................. H04S 7/301
2021/0216057 A1* 7/2021 Bailey ................. G06F 11/3006
2023/0035075 A1* 2/2023 Carrigan ................. G06F 3/165
2025/0261139 A1* 8/2025 Zhang ................ G01C 21/1656

FOREIGN PATENT DOCUMENTS

JP 2015162821 A * 9/2015
JP 2018-121256 A 8/2018

* cited by examiner

*Primary Examiner* — Bhavesh M Mehta
*Assistant Examiner* — Eunice Lee
(74) *Attorney, Agent, or Firm* — ScienBiziP, P.C.

(57) ABSTRACT

A voice processing system includes: a computation processing unit that computes a first transmission time when a first speech voice of a first user is input to a first wireless microphone speaker device carried by the first user and received by a voice processing device, and a second transmission time when the first speech voice of the first user is input to a wired microphone speaker device and received by the voice processing device; and an adjustment processing unit that adjusts a delay time of at least either of the first wireless microphone speaker device and the wired microphone speaker device, based on the first transmission time and the second transmission time to be computed by the computation processing unit.

10 Claims, 13 Drawing Sheets

FIG. 5

D1

DELAY INFORMATION

| EQUIPMENT ID | RADIO FIELD STRENGTH | ESTIMATED DISTANCE | DELAY TIME |
|---|---|---|---|
| A001 | E1 | L1 | T1 |
| A002 | E2 | L2 | T2 |
| A003 | E3 | L3 | T3 |
| A004 | E4 | L4 | T4 |
| B001 | – | – | T5 |

VOICE PROCESSING SYSTEM AND VOICE PROCESSING METHOD

INCORPORATION BY REFERENCE

This application is based upon and claims the benefit of priority from the corresponding Japanese Patent Application No. 2023-054673 filed on Mar. 30, 2023, the entire contents of which are incorporated herein by reference.

BACKGROUND

The present disclosure relates to a voice processing system and a voice processing method of transmitting and receiving a voice by a portable microphone speaker device carried by a user.

Conventionally, a neck hanging type microphone speaker device capable of being mounted around the neck of a user is known. According to the microphone speaker device, the user can listen to a reproduced voice without closing his/her ears, and can collect a speech voice without preparing a device for voice collection.

Herein, in an online meeting such as a web meeting or a video meeting, when there is a user who participates in the meeting without carrying a portable wireless microphone speaker device, a wired microphone speaker device wiredly connected to a voice processing device is installed in a meeting room in such a way that the user can participate in the meeting. In a meeting format as described above, in a voice processing device, the following problem occurs in processing of mixing a voice to be received from a wireless microphone speaker device, and a voice to be received from a wired microphone speaker device. For example, a delay of voice by a connection method between a wireless microphone speaker device and a wired microphone speaker device, and a delay when a voice of a user of the wireless microphone speaker device propagates in the air, and is input to the microphone of the wired microphone speaker device, and is received by the voice processing device occur. When voices are mixed in the voice processing device due to these delays, there occurs a problem that a voice is heard as if the voice were prolonged, and voice quality is deteriorated.

SUMMARY

An object of the present disclosure is to provide a voice processing system and a voice processing method capable of preventing deterioration in quality of speech voice of a user, when a wireless acoustic device and a wired acoustic device are used together in the same space.

A voice processing system according to an aspect of the present disclosure is a system in which a wireless microphone speaker device capable of being carried by a user and wirelessly connected, and a wired microphone speaker device that is wiredly connected are disposed in a same space, the system including a voice processing device that processes a voice to be received from each of the wireless microphone speaker device and the wired microphone speaker device. The voice processing system includes a computation processing unit and an adjustment processing unit. The computation processing unit computes a first transmission time when a first speech voice of a first user is input to a first wireless microphone speaker device carried by the first user and received by the voice processing device, and a second transmission time when the first speech voice of the first user is input to the wired microphone speaker device and received by the voice processing device. The adjustment processing unit adjusts a delay time of at least either of the first wireless microphone speaker device and the wired microphone speaker device, based on the first transmission time and the second transmission time to be computed by the computation processing unit.

A voice processing method according to another aspect of the present disclosure is a method to be performed in a voice processing device in which a wireless microphone speaker device capable of being carried by a user and wirelessly connected, and a wired microphone speaker device that is wiredly connected are disposed in a same space, the voice processing device processing a voice to be received from each of the wireless microphone speaker device and the wired microphone speaker device. In the voice processing method, one or more processing units perform computing a first transmission time when a first speech voice of a first user is input to a first wireless microphone speaker device carried by the first user and received by the voice processing device, and a second transmission time when the first speech voice of the first user is input to the wired microphone speaker device and received by the voice processing device; and adjusting a delay time of at least either of the first wireless microphone speaker device and the wired microphone speaker device, based on the first transmission time and the second transmission time.

According to the present disclosure, it is possible to provide a voice processing system and a voice processing method capable of preventing deterioration in quality of speech voice of a user, when a wireless acoustic device and a wired acoustic device are used together in the same space.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a diagram illustrating an example of delay information to be used in the voice processing system according to the embodiment of the present disclosure.

DETAILED DESCRIPTION

Hereinafter, an embodiment according to the present disclosure is described with reference to the accompanying drawings. Note that, the following embodiment is an example embodying the present disclosure, and does not limit the technical scope of the present disclosure.

A voice processing system according to the present disclosure can be applied to, for example, a case where a meeting is held in a meeting room in a state that some of a plurality of users carry a wireless microphone speaker device, and the remaining users do not carry a wireless microphone speaker device. The wireless microphone speaker device is portable wireless acoustic equipment carried by a user. In addition, the wireless microphone speaker device has, for example, a neck band shape, and the user participates in a meeting while wearing the wireless microphone speaker device around his/her neck. The user can listen to a voice to be reproduced from the speaker of the wireless microphone speaker device, and can cause the microphone of the wireless microphone speaker device to collect voices uttered by the user. The user who does not carry a wireless microphone speaker device can listen to the voice to be reproduced from the speaker of a stationary wired microphone speaker device installed in the meeting room, and can cause the microphone of the wired microphone speaker device to collect voices uttered by the user. Note that, the voice processing system according to the present disclosure can also be applied to a case where an online meeting is held in which voice data are transmitted and received via a network by allowing a plurality of users at a plurality of sites to use a wireless microphone speaker device and a wired microphone speaker device.

Figure 1:
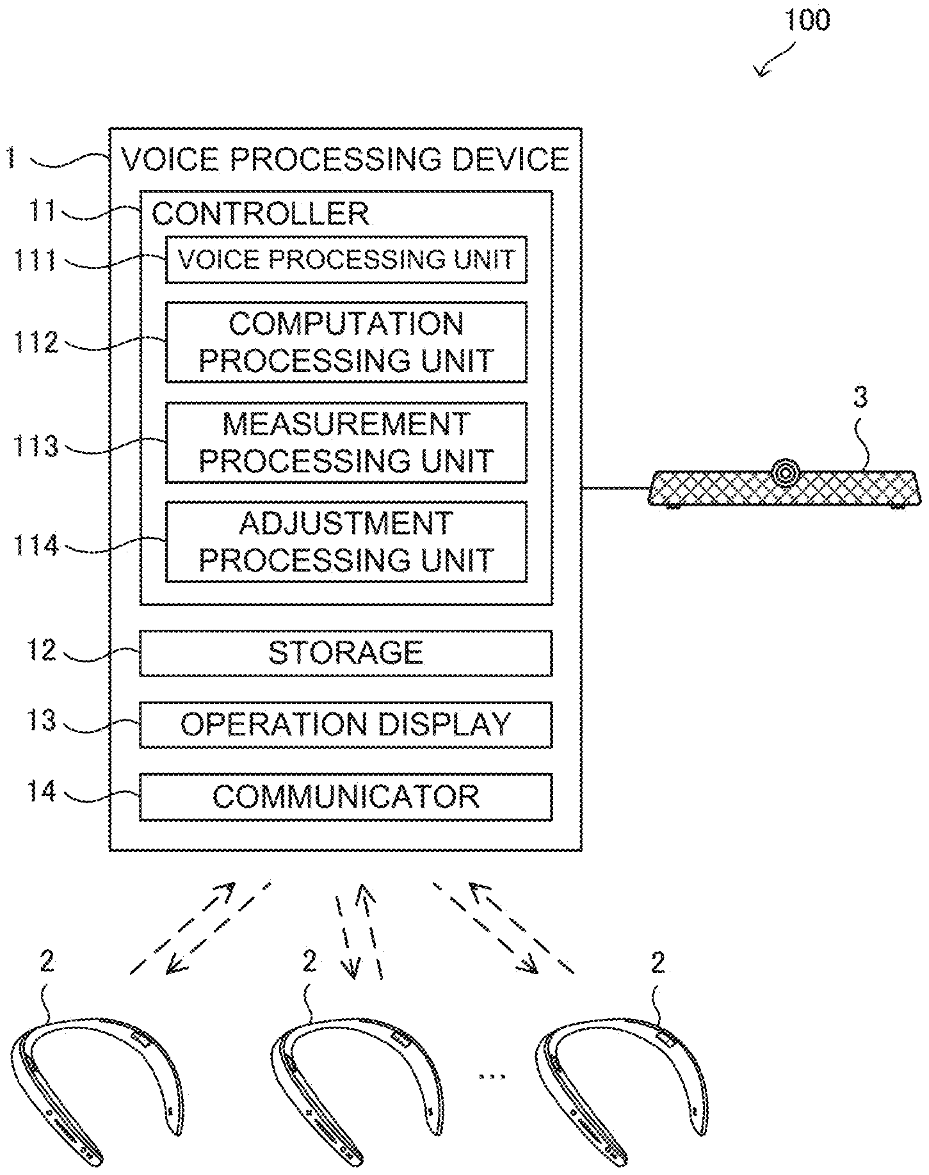
FIG. 1 is a diagram illustrating a configuration of a voice processing system according to an embodiment of the present disclosure.

Voice Processing System 100 FIG. 1 is a diagram illustrating a configuration of a voice processing system 100 according to an embodiment of the present disclosure. The voice processing system 100 includes a voice processing device 1, a wireless microphone speaker device 2, and a wired microphone speaker device 3. The wireless microphone speaker device 2 is wireless connection type acoustic equipment in which a microphone 24 and a speaker 25 (see FIG. 4) are loaded. Note that, the wireless microphone speaker device 2 may have a function such as, for example, an AI speaker, and a smart speaker. The wired microphone speaker device 3 is wired connection type acoustic equipment in which a microphone and a speaker (not illustrated) are loaded. Note that, the wired microphone speaker device 3 may also have a function such as an AI speaker, and a smart speaker. The voice processing system 100 is a system including the wireless microphone speaker device 2 and the wired microphone speaker device 3, and configured to transmit and receive voice data of speech voice of a user between the wireless microphone speaker device 2 and the wired microphone speaker device 3. The voice processing system 100 is an example of a voice processing system according to the present disclosure.

The voice processing device 1 performs processing of controlling the wireless microphone speaker device 2 and the wired microphone speaker device 3, and transmitting and receiving a voice between the wireless microphone speaker device 2 and the wired microphone speaker device 3, for example, when a meeting is started in a meeting room. Note that, the voice processing device 1 alone may constitute the voice processing system according to the present disclosure. When the voice processing system according to the present disclosure is constituted of the voice processing device 1 alone, the voice processing device 1 may accumulate, as a recording voice, a voice to be acquired from the wireless microphone speaker device 2 and the wired microphone speaker device 3, or may perform processing (voice recognition processing) of recognizing an acquired voice in the own device. Further, the voice processing system according to the present disclosure may include various servers that provide various services such as a meeting service, a subtitle service by voice recognition, a translation service, and a minutes service.

Figure 2:
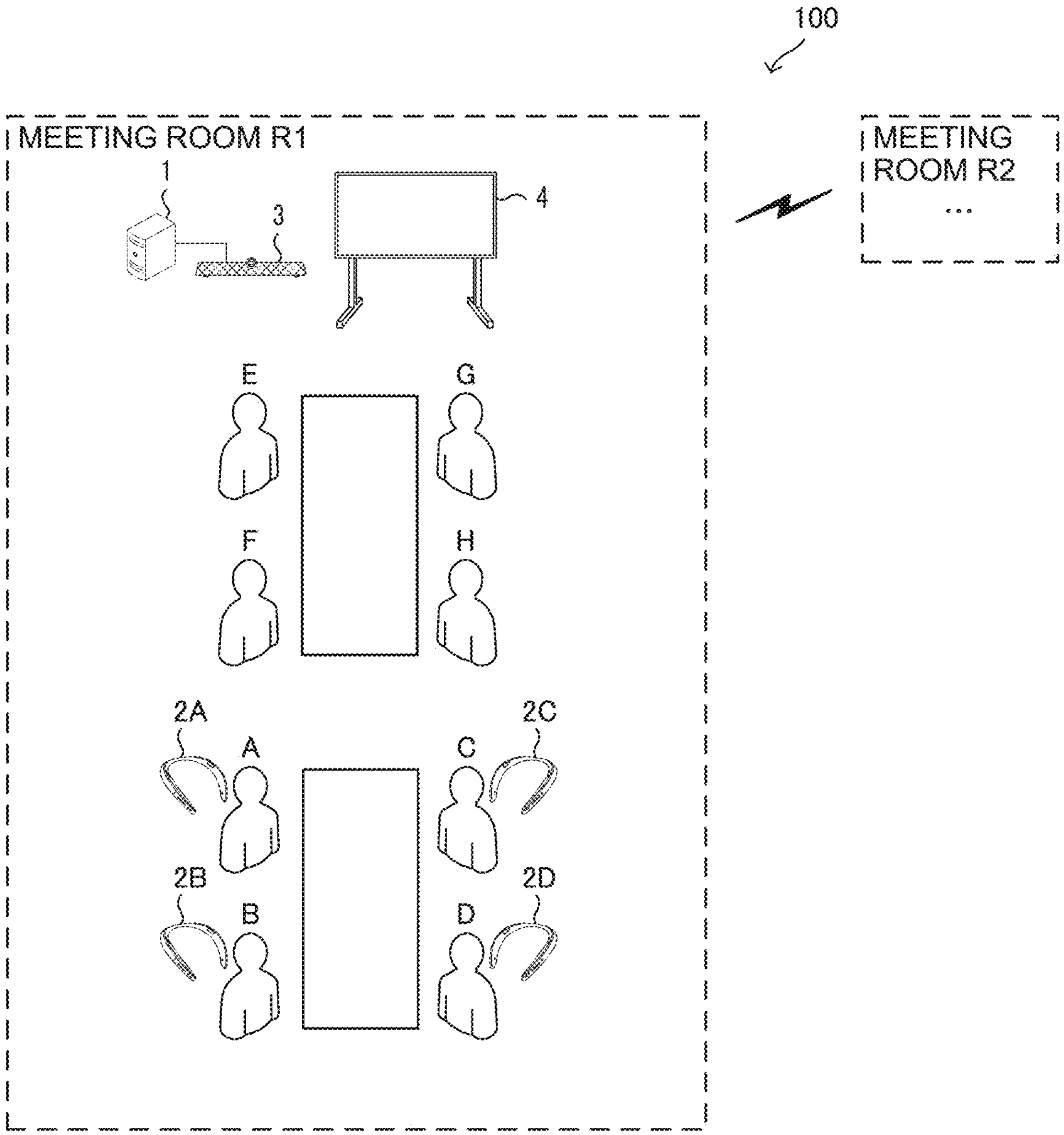
FIG. 2 is a diagram illustrating an application example of the voice processing system according to the embodiment of the present disclosure.

In the present embodiment, an online meeting illustrated in FIG. 2 is described as an example. Users A, B, C, and D, who are participants of the online meeting, respectively wear wireless microphone speaker devices 2A, 2B, 2C, and 2D around their necks, and participate in the meeting in a meeting room R1. Further, each of users E, F, G, and H, who are participants of the meeting, participates in the meeting without carrying a wireless microphone speaker device 2 in the meeting room R1. A voice processing device 1, a wired microphone speaker device 3, and a display 4 are installed in the meeting room R1. The voice processing device 1 and the wireless microphone speaker devices 2A, 2B, 2C, and 2D are connected by a wireless communication method such as Bluetooth (registered trademark). The voice processing device 1 and the wired microphone speaker device 3 are connected in a wired manner via an audio cable, a USB cable, a wired LAN, or the like.

Similarly, in a meeting room R2, a user who participates in the online meeting participates in the meeting while carrying a wireless microphone speaker device 2, and a voice processing device 1, a wired microphone speaker device 3, and a display 4 are installed in the meeting room R2.

For example, when the voice processing device 1 in the meeting room R1 acquires data of speech voice of the user A from the wireless microphone speaker device 2A, the voice processing device 1 transmits the voice data to the voice processing device 1 in the meeting room R2, and the voice processing device 1 reproduces the speech voice from each of the wireless microphone speaker device 2 and the wired microphone speaker device 3 in the meeting room R2. Further, for example, when the voice processing device 1 in the meeting room R2 acquires data of speech voice of a user in the meeting room R2 from the wired microphone speaker device 3, the voice processing device 1 transmits the voice data to the voice processing device 1 in the meeting room R1, and the voice processing device 1 reproduces the speech voice from each of the wireless microphone speaker device 2 and the wired microphone speaker device 3 in the meeting room R1.

Figure 3:
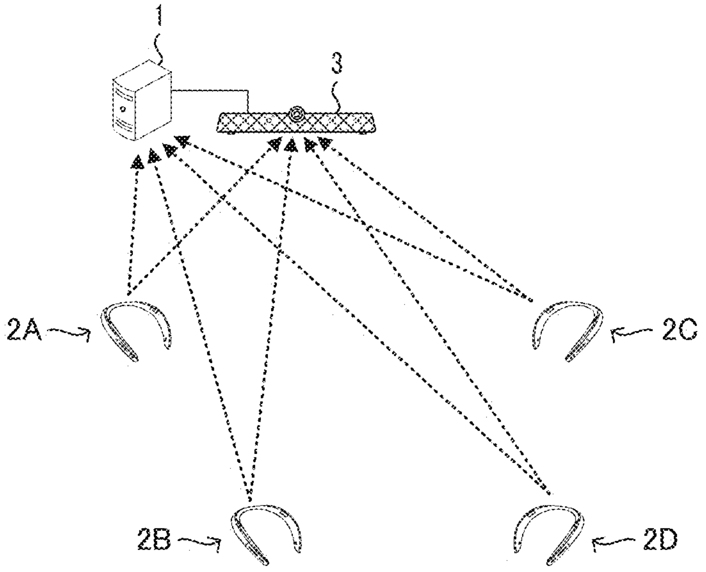
FIG. 3 is a diagram illustrating an example of a positional relationship between a wireless microphone speaker device and a wired microphone speaker device included in the voice processing system according to the embodiment of the present disclosure.

Herein, when the wireless microphone speaker device 2 and the wired microphone speaker device 3 are used together in the same space (for example, in the meeting room R1), the voice processing device 1 receives a voice to be input to the wireless microphone speaker device 2, and a voice to be input to the wired microphone speaker device 3 when the user utters. In this case, the following problem occurs in the voice mixing processing. For example, a delay of voice by a connection method between the wireless microphone speaker device 2 and the wired microphone speaker device 3, and a delay when a voice of a user of the wireless microphone speaker device 2 propagates in the air, is input to the wired microphone speaker device 3 by the microphone, and is received by the voice processing device 1 occur. When a different delay (difference in transmission time) occurs in each voice as described above, there occurs a problem that a voice mixed in the voice processing device 1 is heard as if the voice were prolonged, and voice quality is deteriorated. In order to solve this problem, for example, a method of giving a delay time to a voice received earlier in such a way that the voice matches a voice to be received later is considered. However, as illustrated in FIG. 3, when a plurality of wireless microphone speaker devices 2 are disposed at a position having a different distance with respect to the wired microphone speaker device 3 in the same space, a time (transmission time (spatial delay)) from a time when speech voice of the user propagates in the air until the voice is input to the wired microphone speaker device 3 is different. Therefore, in a case of an environment in which a plurality of wireless microphone speaker devices 2 are used, it is necessary to set a delay time associated with the wireless microphone speaker device 2 of the user, every time the user utters, which makes the processing complicated.

In contrast, as described below, the voice processing system according to the present embodiment sets in advance an appropriate delay time for each of the wireless microphone speaker device 2 and the wired microphone speaker device 3, while taking into consideration each of the wireless microphone speaker device 2 and the wired microphone speaker device 3 disposed in the same space, thereby enabling to prevent deterioration of voice quality, while suppressing a load on transmission/reception processing of an input voice thereafter.

Figure 4:
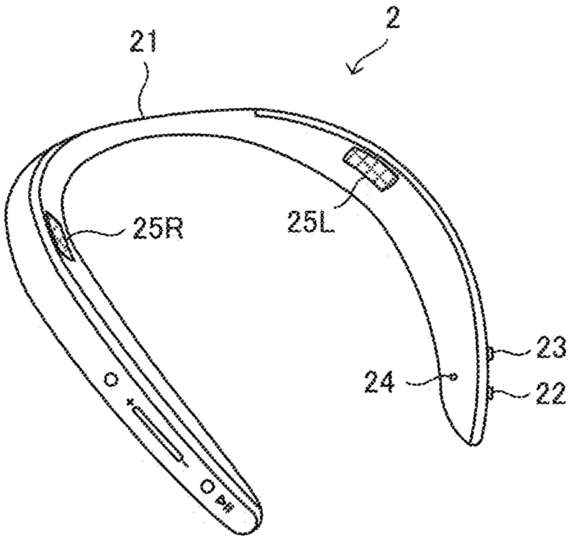
FIG. 4 is an external view illustrating a configuration of a microphone speaker device according to the embodiment of the present disclosure.

Wireless Microphone Speaker Device 2 FIG. 4 illustrates an example of an external appearance of the wireless microphone speaker device 2. As illustrated in FIG. 4, the wireless microphone speaker device 2 includes a power supply 22, a connection button 23, the microphone 24, the speaker 25, a communicator (not illustrated), and the like. The wireless microphone speaker device 2 is, for example, neck band type wearable equipment which can be worn around the neck of a user. The wireless microphone speaker device 2 acquires a voice uttered by a user via the microphone 24, and reproduces (outputs) a voice from the speaker 25 to the user. The wireless microphone speaker device 2 may include a display that displays various pieces of information.

A main body 21 of the wireless microphone speaker device 2 includes left and right arms when viewed from a user wearing the wireless microphone speaker device 2, and is formed into a U shape.

The microphone 24 is disposed at a distal end of the wireless microphone speaker device 2 in such a way as to easily collect speech voice of a user. The microphone 24 is connected to a microphone substrate (not illustrated) built in the wireless microphone speaker device 2.

The speaker 25 includes a speaker 25L disposed on the left arm and a speaker 25R disposed on the right arm when viewed from a user wearing the wireless microphone speaker device 2. The speakers 25L and 25R are disposed in the vicinity of a middle of the arm of the wireless microphone speaker device 2 in such a way that a user can easily hear a reproduced voice. The speakers 25L and 25R are connected to a speaker substrate (not illustrated) built in the wireless microphone speaker device 2.

The microphone substrate is a transmitter substrate for transmitting voice data to the voice processing device 1, and is included in the communicator. Further, the speaker substrate is a receiver substrate for receiving voice data from the voice processing device 1, and is included in the communicator.

The communicator is a communication interface for performing data communication in accordance with a predetermined communication protocol between the wireless microphone speaker device 2 and the voice processing device 1 in a wireless manner. Specifically, the communicator is connected to and communicates with the wireless microphone speaker device 2 by, for example, a Bluetooth method. For example, when the user presses the connection button 23 after turning on the power supply 22, the communicator performs pairing processing, and connects the wireless microphone speaker device 2 to the voice processing device 1. Note that, a transmitter may be disposed between the wireless microphone speaker device 2 and the voice processing device 1, the transmitter may be paired with (Bluetooth connected to) the wireless microphone speaker device 2, and the transmitter and the voice processing device 1 may be connected via the Internet.

Voice Processing Device 1

As illustrated in FIG. 1, the voice processing device 1 is an information processing device (for example, a personal computer) including a controller 11, a storage 12, an operation display 13, a communicator 14, and the like. Note that, the voice processing device 1 is not limited to a single computer, and may be a computer system in which a plurality of computers operate in cooperation. Further, various pieces of processing to be performed by the voice processing device 1 may be distributed and performed by one or more processing units.

For example, the voice processing device 1 may be constituted of equipment having a function of transmitting and receiving a voice and a function of mixing voices, and equipment having a function of performing an online meeting.

The communicator 14 is a communicator for connecting the voice processing device 1 to a communication network in a wired or wireless manner, and performing data communication in accordance with a predetermined communication protocol with external equipment such as the wireless microphone speaker device 2 or the wired microphone speaker device 3 via the communication network. For example, the communicator 14 performs pairing processing by a Bluetooth method, and is wirelessly connected to the wireless microphone speaker device 2. In addition, the communicator 14 is wiredly connected to the wired microphone speaker device 3 by an audio cable, a USB cable, a wired LAN, or the like.

The operation display 13 is a user interface including a display such as a liquid crystal display or an organic EL display that displays various pieces of information, and an operation acceptor such as a mouse, a keyboard, or a touch panel that receives an operation. The display may be the display 4 (see FIG. 2) configured separately from the voice processing device 1, and connected to the voice processing device 1 in a wired or wireless manner.

The storage 12 is a non-volatile storage such as a hard disk drive (HDD) or a solid state drive (SSD) that stores various pieces of information. Specifically, data such as delay information D1 of each of the wireless microphone speaker device 2 and the wired microphone speaker device 3 are stored in the storage 12.

FIG. 5 illustrates an example of the delay information D1. As illustrated in FIG. 5, the delay information D1 includes information such as "equipment ID", "radio field intensity", "estimated distance", and "delay time". The equipment ID is identification information of each of the wireless microphone speaker device 2 and the wired microphone speaker device 3, and for example, an equipment number is registered. Herein, each of "A001" to "A004" is associated with each of the wireless microphone speaker devices 2A to 2D, and "B001" is associated with the wired microphone speaker device 3. The radio field intensity is information indicating a radio field intensity of the wireless microphone speaker device 2. The controller 11 monitors a radio field intensity of each wireless microphone speaker device 2 in real time. The estimated distance is information indicating a distance between each wireless microphone speaker device 2 and the wired microphone speaker device 3. The controller 11 estimates the distance, based on a radio field intensity of each wireless microphone speaker device 2. The delay time is information indicating a delay amount to be given to a voice to be input from each wireless microphone speaker device 2 and the wired microphone speaker device 3. The controller 11 adjusts the delay time in such a way that a delay of an input voice becomes the same in each of the wireless microphone speaker devices 2 and the wired microphone speaker device 3 disposed in the meeting room R1. When the controller 11 adjusts (sets) the delay time, the controller 11 gives the delay time in mixing processing of a voice to be input thereafter, and reproduces (outputs) the voice. For example, before a meeting is started, the controller 11 starts measurement of a radio field intensity at a stage of detecting each of the wireless microphone speaker device 2 and the wired microphone speaker device 3, computes the estimated distance and the delay time, and registers the estimated distance and the delay time in the delay information D1.

In addition, the storage 12 stores a control program such as a delay adjustment program (an example of a voice processing program according to the present disclosure) for causing the controller 11 to perform delay adjustment processing (see FIG. 11) to be described later. For example, the delay adjustment program may be non-transitorily recorded on a computer-readable recording medium such as a CD or a DVD, read by a reading device (not illustrated) such as a CD drive or a DVD drive included in the voice processing device 1, and stored in the storage 12.

The controller 11 includes control equipment such as a CPU, a ROM, and a RAM. The CPU is a processing unit that executes various pieces of arithmetic processing. The ROM is a non-volatile storage in which a control program such as a BIOS and an OS for causing the CPU to execute various pieces of arithmetic processing is stored in advance. The RAM is a volatile or non-volatile storage that stores various pieces of information, and is used as a temporary storage memory (work area) in which the CPU executes various pieces of processing. Then, the controller 11 controls the voice processing device 1 by causing the CPU to execute various control programs stored in advance in the ROM or the storage 12.

Specifically, as illustrated in FIG. 1, the controller 11 includes various processing units such as a voice processing unit 111, a computation processing unit 112, a measurement processing unit 113, and an adjustment processing unit 114. Note that, the controller 11 functions as the various processing units by causing the CPU to execute various pieces of processing according to the control program. In addition, some or all of the processing units may be constituted of an electronic circuit. Note that, the control program may be a program for causing a plurality of processing units to function as the processing units.

When receiving voice data, the voice processing unit 111 performs predetermined voice processing, and outputs the processed data. Specifically, when the user utters, the voice processing unit 111 receives voice data from the wireless microphone speaker device 2 and the wired microphone speaker device 3 to which speech voice is input. Further, the voice processing unit 111 performs well-known mixing processing on the received voice data, and outputs the processed data. For example, when the user A utters in the meeting room R1, and speech voice is input to each of the wireless microphone speaker device 2A and the wired microphone speaker device 3, the voice processing unit 111 receives the voice from each of the wireless microphone speaker device 2A and the wired microphone speaker device 3. The voice processing unit 111 performs voice processing such as mixing a voice received from each of the wireless microphone speaker device 2A and the wired microphone speaker device 3, and transmits the processed voice to the voice processing device 1 in the meeting room R2.

In addition, for example, when the user E utters in the meeting room R1, and speech voice is input to the wired microphone speaker device 3, the voice processing unit 111 receives the voice from the wired microphone speaker device 3. The voice processing unit 111 performs voice processing such as mixing the voice received from the wired microphone speaker device 3, and transmits the processed voice to the voice processing device 1 in the meeting room R2.

Herein, the controller 11 performs adjustment processing of adjusting a delay (difference in transmission time) that occurs between the microphone speaker devices in the same space.

Specifically, the computation processing unit 112 computes a first transmission time when a first speech voice of a first user is input to a first wireless microphone speaker device 2 carried by the first user and received by the voice processing device 1, and a second transmission time when the first speech voice of the first user propagates in the air, is input to the wired microphone speaker device 3, and is received by the voice processing device 1. For example, the computation processing unit 112 computes the first transmission time, which is a time from a time when the first speech voice is input to the first wireless microphone speaker device 2 until predetermined voice processing is performed in the voice processing device 1.

In addition, the computation processing unit 112 computes a second transmission time, which is a time from a time when the first speech voice propagates in the air and is input to the wired microphone speaker device 3 until predetermined voice processing is performed in the voice processing device 1. Specifically, the measurement processing unit 113 measures a distance between the first wireless microphone speaker device 2 and the voice processing device 1, and the computation processing unit 112 estimates a distance between the first wireless microphone speaker device 2 and the wired microphone speaker device 3, based on the distance to be measured by the measurement processing unit 113, and computes the second transmission time, based on the estimated distance.

For example, the measurement processing unit 113 measures a distance between the first wireless microphone speaker device 2 and the voice processing device 1, based on a radio field intensity of the first wireless microphone speaker device 2. Herein, when the wired microphone speaker device 3 is disposed in the vicinity of the voice processing device 1 (or when the wired microphone speaker device 3 and the voice processing device 1 are integrally configured), a distance between the first wireless microphone speaker device 2 and the wired microphone speaker device 3 can be regarded as the same as a distance between the first wireless microphone speaker device 2 and the voice processing device 1. Therefore, the computation processing unit 112 can compute the second transmission time, based on the distance between the first wireless microphone speaker device 2 and the wired microphone speaker device 3. Note that, the measurement processing unit 113 measures a radio field intensity of each wireless microphone speaker device 2 in real time, and registers the measured radio field intensity in the delay information D1 (see FIG. 5). In addition, the computation processing unit 112 registers, in the delay information D1, a distance between each wireless microphone speaker device 2 and the wired microphone speaker device 3 that is computed based on a radio field intensity. The stronger the radio field intensity of the wireless microphone speaker device 2, the shorter the distance between the wireless microphone speaker device 2, and the voice processing device 1 and the wired microphone speaker device 3, and the weaker the radio field intensity of the wireless microphone speaker device 2, the longer the distance between the wireless microphone speaker device 2, and the voice processing device 1 and the wired microphone speaker device 3.

As another embodiment, when the voice processing device 1 is provided with a sensor that measures a radio field intensity, the sensor may measure a distance from the voice processing device 1 to each of the first wireless microphone speaker device 2 and the wired microphone speaker device 3, and the measurement processing unit 113 may measure a distance between the first wireless microphone speaker device 2 and the wired microphone speaker device 3, based on the measurement result. Further, when the voice processing device 1 is provided with a camera that measures a distance to external equipment, the camera may measure a distance from the voice processing device 1 to each of the first wireless microphone speaker device 2 and the wired microphone speaker device 3, and the measurement processing unit 113 may measure a distance between the first wireless microphone speaker device 2 and the wired microphone speaker device 3, based on the measurement result.

The computation processing unit 112 computes a transmission time until speech voice is input to the wired microphone speaker device 3, based on an estimated distance between the first wireless microphone speaker device 2 and the wired microphone speaker device 3. For example, when a speed of sound is 340 m/s, and a time required for the sound to propagate in the air by 1 m is about 3 ms, the computation processing unit 112 can compute a transmission time by using the relational equation (distance×3 ms).

In addition, the computation processing unit 112 computes, as the first transmission time, a fixed value set in advance by a wireless communication method. For example, when a Bluetooth profile is HFP1.6 or more, a transmission time (first transmission time) from the wireless microphone speaker device 2 to the voice processing device 1 becomes about 40 ms (fixed value). Therefore, in each of the wireless microphone speaker devices 2A to 2D disposed in the meeting room R1, the first transmission time of voice becomes 40 ms. Note that, a communication delay (first transmission time) by the wireless communication method (Bluetooth) is a delay time (for example, 40 ms) that occurs when a microphone and a speaker are used simultaneously. Further, actually, the first transmission time includes a transmission time (300000 km/S) of a radio wave, and a processing time of predetermined voice processing in the wireless microphone speaker device 2 and the voice processing device 1 (for example, a processing time for converting an audio signal into a radio signal in the wireless microphone speaker device 2, and a processing time for converting a radio signal into an audio signal in the voice processing device 1). However, since the transmission time for transmission by radio wave can be ignored, the first transmission time becomes substantially a voice processing time (40 ms).

The adjustment processing unit 114 adjusts a delay time of at least either of the first wireless microphone speaker device 2 and the wired microphone speaker device 3, based on the first transmission time and the second transmission time to be computed by the computation processing unit 112. Specifically, when the first transmission time is longer than the second transmission time, the adjustment processing unit 114 gives a delay time associated with a difference between the first transmission time (communication delay) and the second transmission time (spatial delay) to speech voice to be input from the wired microphone speaker device 3. Hereinafter, a specific example is described.

Figure 6A:
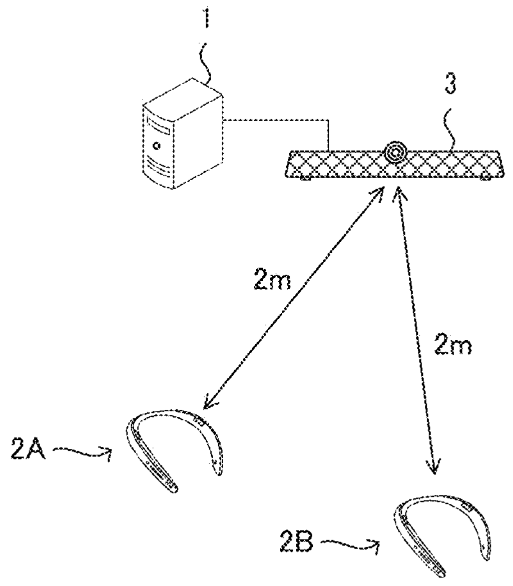
FIG. 6A is a diagram illustrating an example of a method of adjusting a delay time according to the embodiment of the present disclosure.
Figure 6B:
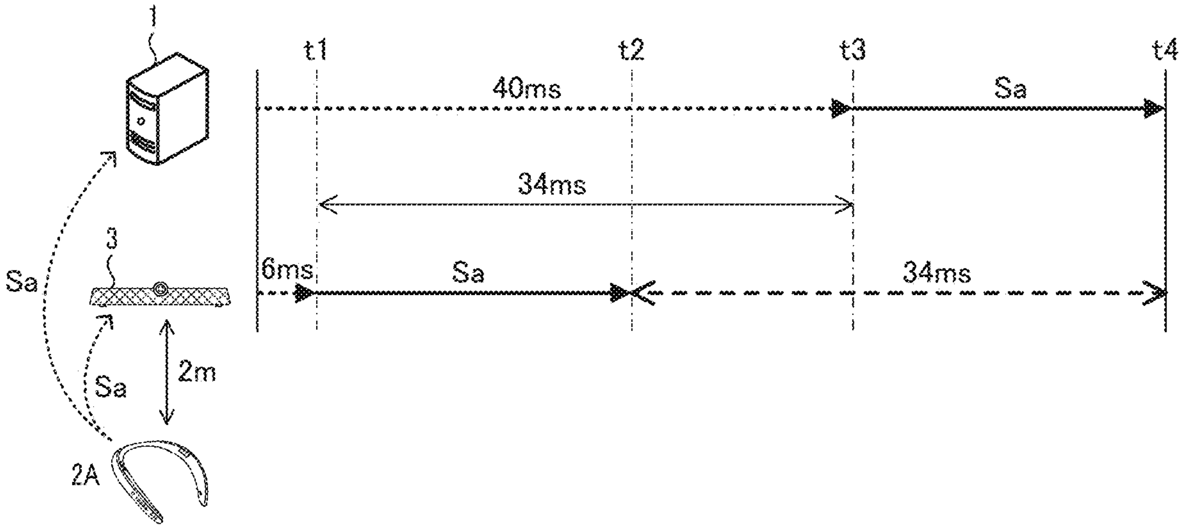
FIG. 6B is a diagram illustrating an example of a method of adjusting a delay time according to the embodiment of the present disclosure.

FIG. 6A illustrates the wireless microphone speaker devices 2A and 2B each disposed at a position away from the wired microphone speaker device 3 by 2 m. FIG. 6B illustrates a method of setting a voice transmission time and a delay time. For example, when the user A utters in the environment illustrated in FIG. 6A, speech voice (voice Sa) of the user A is input to the wireless microphone speaker device 2A and the wired microphone speaker device 3. Note that, in FIG. 6A, times t1 to t2 and times t3 to t4 of a reference sign Sa represent a time (speech time) during which the user A utters. Similarly, in the drawings thereafter, for example, reference signs Sb to Sd represent a speech time of a user.

The voice Sa is input to the wireless microphone speaker device 2A without delay from utterance of the user A, and received by the voice processing device 1 at the time t3 after an elapse of 40 ms through transmission by wireless communication. On the other hand, the voice is input to the wired microphone speaker device 3 at the time t1 after an elapse of a transmission time (6 ms) during which the voice propagates in the air from utterance of the user A. Note that, since the wired microphone speaker device 3 is wiredly connected to the voice processing device 1, the voice is received by the voice processing device 1 without delay from input to the wired microphone speaker device 3. Note that, actually, the transmission time includes a time (340 m/S) during which the voice propagates in the air, and a processing time of predetermined voice processing in the voice processing device 1 (for example, a processing time for converting the voice into an audio signal in the voice processing device 1), but since the processing time of voice processing is usually very short and can be ignored, the transmission time becomes substantially a propagation time (for example, 6 ms) during which the voice propagates in the air. In this way, the voice processing device 1 receives the voice Sa via the wired microphone speaker device 3 after 6 ms from utterance of the user A, and receives the voice Sa via the wireless microphone speaker device 2A after 40 ms from utterance of the user A. Therefore, a difference in transmission time of 34 ms occurs. In view of the above, the adjustment processing unit 114 gives a delay time of 34 ms, which is the difference in transmission time, to the voice Sa input to the wired microphone speaker device 3 that has received the voice Sa earlier. Specifically, in the environment illustrated in FIG. 6A, the adjustment processing unit 114 sets a delay time of 34 ms associated with each of the wireless microphone speaker devices 2A and 2B to the voice Sa input from the wired microphone speaker device 3, and does not set a delay time to the voice Sa input from the wireless microphone speaker devices 2A and 2B. When a delay time is set as described above, the voice processing unit 111 performs mixing processing on each voice Sa at the time t4, for example, and outputs the processed voice Sa. This enables to prevent deterioration of voice quality.

Figure 7A:
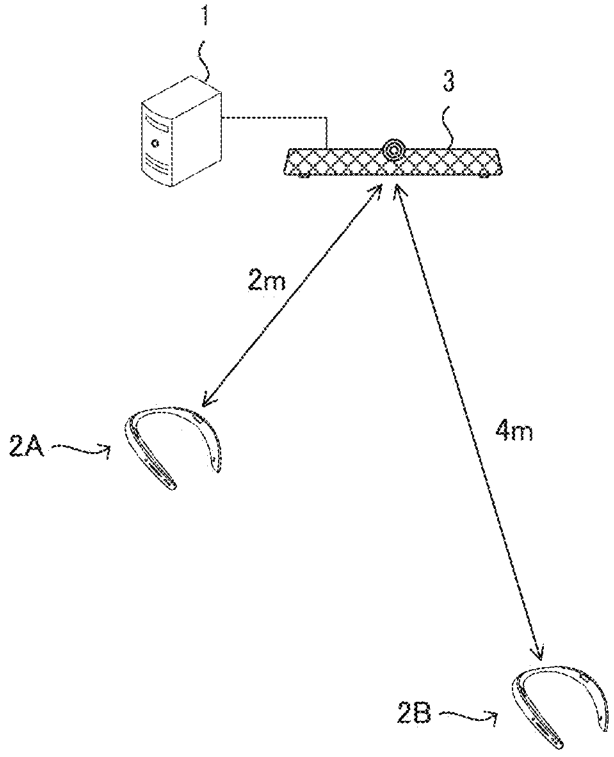
FIG. 7A is a diagram illustrating an example of a method of adjusting a delay time according to the embodiment of the present disclosure.
Figure 7B:
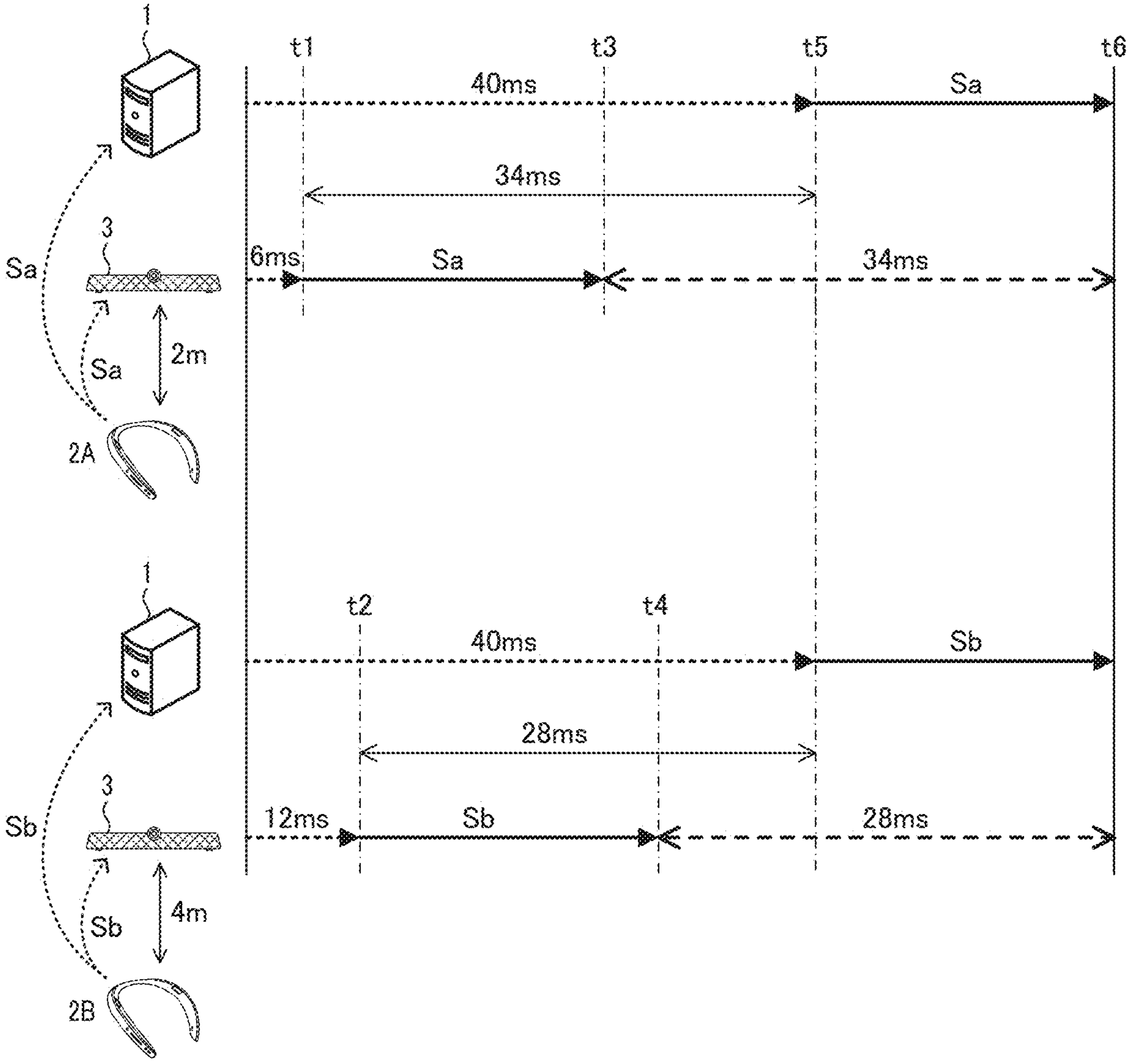
FIG. 7B is a diagram illustrating an example of a method of adjusting a delay time according to the embodiment of the present disclosure.

FIG. 7A illustrates the wireless microphone speaker device 2A disposed at a position away from the wired microphone speaker device 3 by 2 m, and the wireless microphone speaker device 2B disposed at a position away from the wired microphone speaker device 3 by 4 m. FIG. 7B illustrates a method of setting a voice transmission time and a delay time. For example, when the user A utters in the environment illustrated in FIG. 7A, speech voice (voice Sa) of the user A is input to the wireless microphone speaker device 2A and the wired microphone speaker device 3.

The voice Sa is input to the wireless microphone speaker device 2A without delay from utterance of the user A, and received by the voice processing device 1 at the time t3 after an elapse of 40 ms through transmission by wireless communication. On the other hand, the voice is input to the wired microphone speaker device 3 at the time t1 after an elapse of a transmission time (6 ms) during which the voice propagates in the air from utterance of the user A. In this case, similarly to the example in FIG. 6B, since the voice processing device 1 receives the voice Sa via the wired microphone speaker device 3 after 6 ms from utterance of the user A, and receives the voice Sa via the wireless microphone speaker device 2A after 40 ms from utterance of the user A, a difference in transmission time of 34 ms occurs. Therefore, the adjustment processing unit 114 gives a delay time of 34 ms, as a delay time associated with the wireless microphone speaker device 2A, to the voice Sa input from the wired microphone speaker device 3.

In the environment illustrated in FIG. 7A, for example, when the user B utters, the speech voice (voice Sb) of the user B is input to the wireless microphone speaker device 2B and the wired microphone speaker device 3. In addition, the voice Sb is input to the wireless microphone speaker device 2B without delay from utterance of the user B, and received by the voice processing device 1 at the time t5 after an elapse of 40 ms through transmission by wireless communication. On the other hand, the voice is input to the wired microphone speaker device 3 at the time t2 after an elapse of a transmission time (12 ms) during which the voice propagates in the air from utterance of the user B. In this case, since the voice processing device 1 receives the voice Sb via the wired microphone speaker device 3 after 12 ms from utterance of the user B, and receives the voice Sb via the wireless microphone speaker device 2B after 40 ms (at the time t5) from utterance of the user B, a difference in transmission time of 28 ms occurs. Therefore, the adjustment processing unit 114 gives a delay time of 28 ms, as a delay time associated with the wireless microphone speaker device 2B, to the voice Sb input from the wired microphone speaker device 3. In this way, in the environment illustrated in FIG. 7A, the adjustment processing unit 114 sets a delay time of 34 ms to the wired microphone speaker device 3, as delay adjustment with respect to the wireless microphone speaker device 2A, sets a delay time of 28 ms to the wired microphone speaker device 3, as delay adjustment with respect to the wireless microphone speaker device 2B, and does not set a delay time to the wireless microphone speaker devices 2A and 2B. When a delay time is set as described above, the voice processing unit 111 performs mixing processing on each voice Sa and each voice Sb at the time t6, for example, and outputs the processed voice. This enables to prevent deterioration of voice quality.

In this way, when the first wireless microphone speaker device and the second wireless microphone speaker device having a different distance to the wired microphone speaker device 3 from each other are disposed in the same space (meeting room), the adjustment processing unit 114 gives a first delay time associated with the first wireless microphone speaker device, and a second delay time associated with the second wireless microphone speaker device to the voice input from the wired microphone speaker device 3.

In the examples illustrated in FIGS. 6A to 7B, when the wireless connection method is the Bluetooth method, delay by wireless communication becomes dominant. Specifically, when the wearer of the wireless microphone speaker device 2 utters, the voice is input to the microphone of the wireless microphone speaker device 2 of the wearer with almost no delay. However, when the voice propagates in the air and enters the wired microphone speaker device 3, the voice is input to the wired microphone speaker device 3 with a delay, as compared with the wireless microphone speaker device 2. Therefore, subtracting a transmission time during which the voice propagates in the air from a transmission time by wireless communication enables to match the delays of the wireless microphone speaker device 2 and the wired microphone speaker device 3 to each other.

For example, in the case of Bluetooth, since a transmission time by wireless communication is 40 ms, the transmission time becomes dominant. Even when a distance of the wireless microphone speaker device 2 changes, and a transmission time during which the voice propagates in the air increases, the delay matches as a whole by adjusting the whole delay time to be equal to 40 ms, even when the distance of the wireless microphone speaker device 2 does not match.

As another embodiment, the wireless communication method may be a wireless communication method different from Bluetooth. In this case, for example, there may be considered a case where a transmission time (a first transmission time from a time when a voice is input to the wireless microphone speaker device 2 until the voice is received by the voice processing device 1) (communication delay) by wireless communication decreases. Further, there may also be considered a case where a second transmission time (spatial delay) when a voice propagates in the air, and is input to the wired microphone speaker device 3 becomes longer than the communication delay.

Figure 8A:
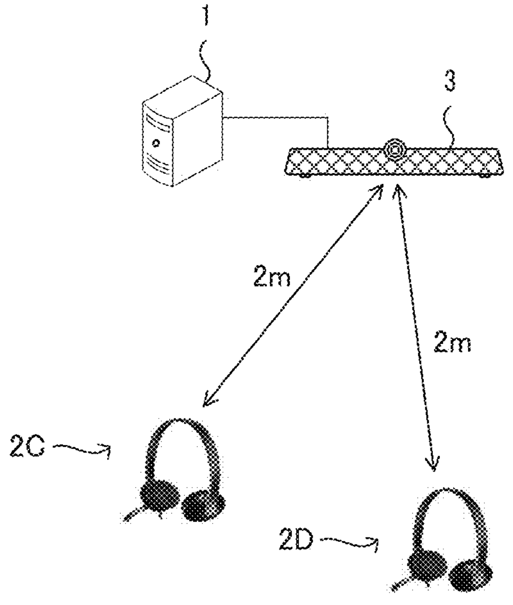
FIG. 8A is a diagram illustrating an example of a method of adjusting a delay time according to the embodiment of the present disclosure.
Figure 8B:
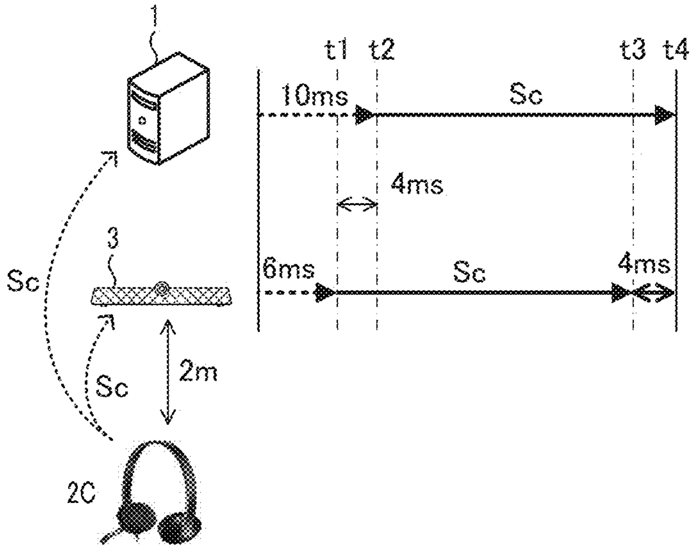
FIG. 8B is a diagram illustrating an example of a method of adjusting a delay time according to the embodiment of the present disclosure.

FIG. 8A illustrates the wireless microphone speaker devices 2C and 2D each disposed at a position away from the wired microphone speaker device 3 by 2 m. FIG. 8B illustrates a method of setting a voice transmission time and a delay time. For example, when the user C utters in the environment illustrated in FIG. 8A, the speech voice (voice Sc) of the user C is input to the wireless microphone speaker device 2C and the wired microphone speaker device 3.

The voice Sc is input to the wireless microphone speaker device 2C without delay from utterance of the user C, and received by the voice processing device 1 at the time t2 after an elapse of 10 ms through transmission by wireless communication. On the other hand, the voice is input at the time t1 after an elapse of a transmission time (6 ms) during which the voice propagates in the air from utterance of the user C. Since the wired microphone speaker device 3 is wiredly connected to the voice processing device 1, the voice is input to the wired microphone speaker device 3, and then received by the voice processing device 1 without delay. In this way, the voice processing device 1 receives the voice Sc via the wired microphone speaker device 3 after 6 ms from utterance of the user C, and receives the voice Sc via the wireless microphone speaker device 2C after 10 ms from utterance of the user C. Therefore, a difference in transmission time of 4 ms occurs. In view of the above, the adjustment processing unit 114 gives a delay time of 4 ms, which is the difference in transmission time, to the voice Sc input from the wired microphone speaker device 3 to which the previously received voice Sc is input. Specifically, the adjustment processing unit 114 sets, in the environment illustrated in FIG. 8A, a delay time of 4 ms associated with each of the wireless microphone speaker devices 2C and 2D to the voice Sc input from the wired microphone speaker device 3, and does not set a delay time to the voice Sc input from the wireless microphone speaker devices 2C and 2D. When a delay time is set as described above, the voice processing unit 111 performs mixing processing on each voice Sc at the time t4, for example, and outputs the processed voice Sc. This enables to prevent deterioration of voice quality.

Figure 9A:
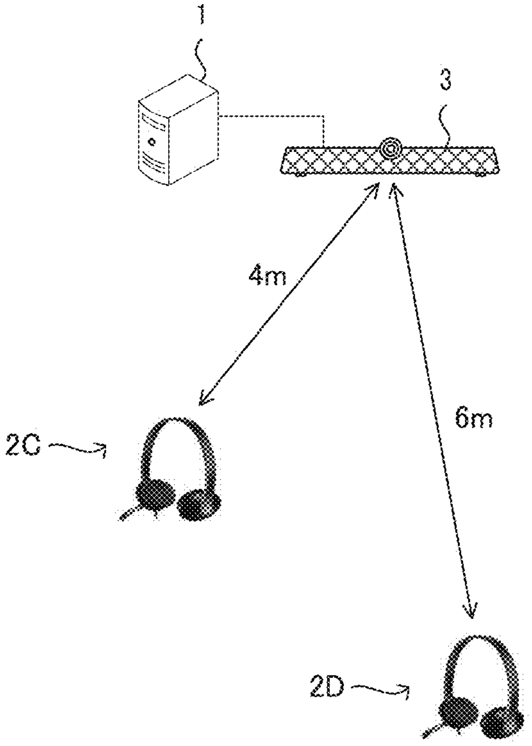
FIG. 9A is a diagram illustrating an example of a method of adjusting a delay time according to the embodiment of the present disclosure.
Figure 9B:
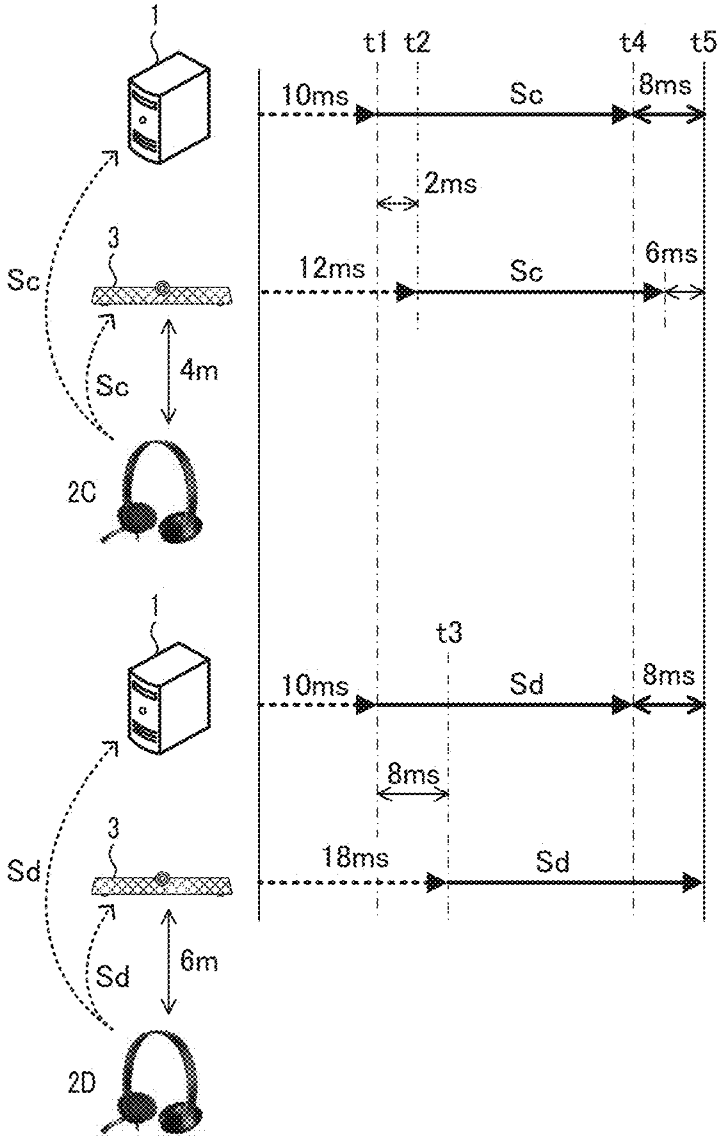
FIG. 9B is a diagram illustrating an example of a method of adjusting a delay time according to the embodiment of the present disclosure.

FIG. 9A illustrates the wireless microphone speaker device 2C disposed at a position away from the wired microphone speaker device 3 by 4 m, and the wireless microphone speaker device 2D disposed at a position away from the wired microphone speaker device 3 by 6 m. FIG. 9B illustrates a method of setting a voice transmission time and a delay time. In the environment illustrated in FIG. 9A, for example, when the user C utters, the speech voice (voice Sc) of the user C is input to the wireless microphone speaker device 2C and the wired microphone speaker device 3, and for example, when the user D utters, the speech voice (voice Sd) of the user D is input to the wireless microphone speaker device 2D and the wired microphone speaker device 3.

The voice Sc is input to the wireless microphone speaker device 2C without delay from utterance of the user C, and received by the voice processing device 1 at the time t1 after an elapse of 10 ms through transmission by wireless communication. In addition, the voice Sd is input to the wireless microphone speaker device 2D without delay from utterance of the user D, and received by the voice processing device 1 at the time t1 after an elapse of 10 ms through transmission by wireless communication. On the other hand, the voice is input to the wired microphone speaker device 3 at the time t2 after an elapse of a transmission time (12 ms) during which the voice propagates in the air from utterance of the user C. Further, the voice is input to the wired microphone speaker device 3 at the time t3 after an elapse of a transmission time (18 ms) during which the voice propagates in the air from utterance of the user D. In this way, the voice processing device 1 receives the voice Sc via the wired microphone speaker device 3 after 12 ms from utterance of the user C, and receives the voice Sc via the wireless microphone speaker device 2C after 10 ms from utterance of the user C. Further, the voice processing device 1 receives the voice Sd via the wired microphone speaker device 3 after 18 ms from utterance of the user D, and receives the voice Sd via the wireless microphone speaker device 2D after 10 ms from utterance of the user D. Therefore, a difference in transmission time of 2 ms occurs in the voice of the user C, and a difference in transmission time of 8 ms occurs in the voice of the user D. In view of the above, the adjustment processing unit 114 gives a delay time to the voice input from the wireless microphone speaker device 2 and the wired microphone speaker device 3 in such a way that the voice matches a voice to be input at the latest time (the voice of the user D to be input to the wired microphone speaker device 3 in FIG. 9A). For example, the adjustment processing unit 114 gives a delay time of 8 ms to each of the voices Sc and Sd input from the wireless microphone speaker devices 2C and 2D, and gives a delay time of 6 ms, as a delay time associated with the wireless microphone speaker device 2C, to the voice Sc input from the wired microphone speaker device 3. When a delay time is set as described above, the voice processing unit 111 performs mixing processing on each voice Sc and Sd at the time t5, for example, and outputs the processed voice. This enables to prevent deterioration of voice quality.

In this way, when the second transmission time (spatial delay) becomes longer than the first transmission time (communication delay), the adjustment processing unit 114 gives a delay time associated with a difference between the first transmission time and the second transmission time to the voice input from the wireless microphone speaker device 2.

Figure 10A:
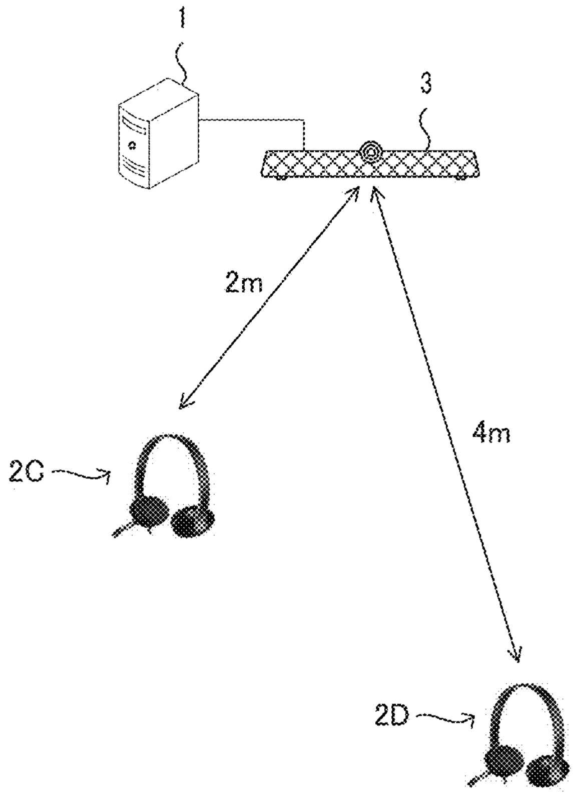
FIG. 10A is a diagram illustrating an example of a method of adjusting a delay time according to the embodiment of the present disclosure.
Figure 10B:
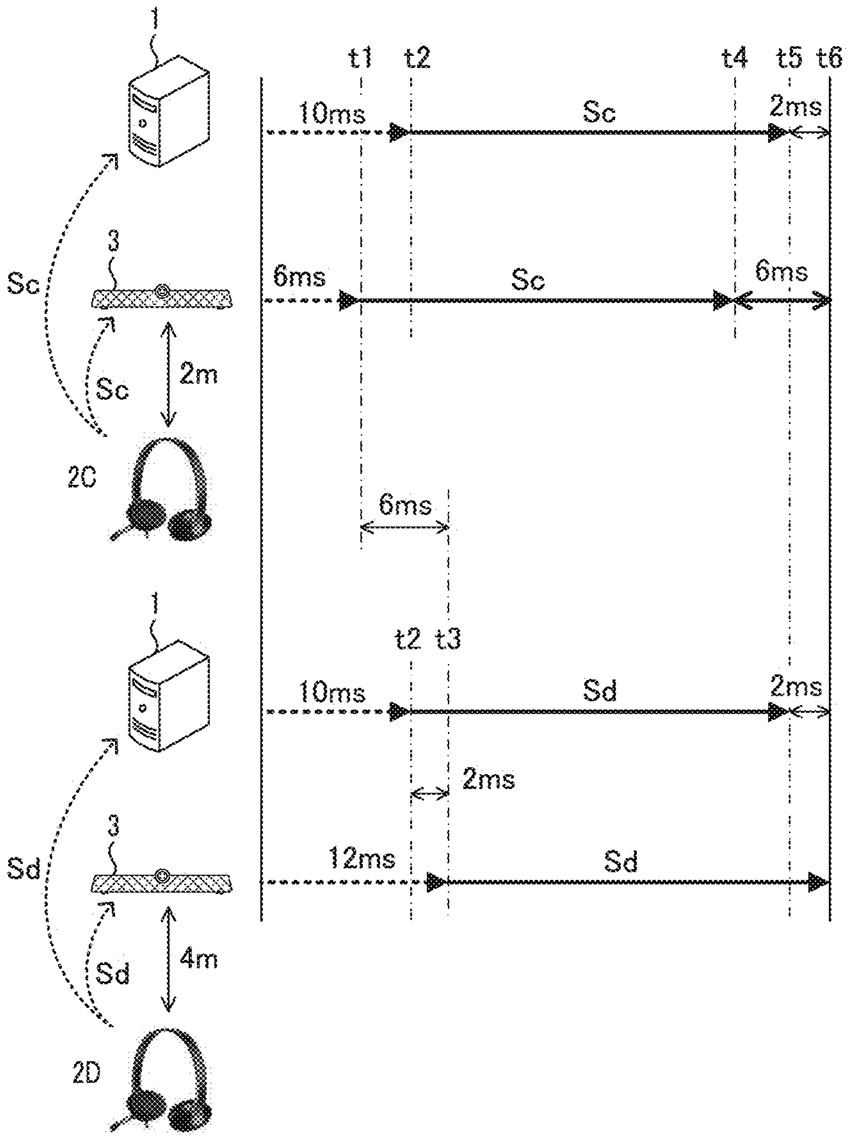
FIG. 10B is a diagram illustrating an example of a method of adjusting a delay time according to the embodiment of the present disclosure.

FIG. 10A illustrates the wireless microphone speaker device 2C disposed at a position away from the wired microphone speaker device 3 by 2 m, and the wireless microphone speaker device 2D disposed at a position away from the wired microphone speaker device 3 by 4 m. FIG. 10B illustrates a method of setting a voice transmission time and a delay time. For example, when the user C utters in the environment illustrated in FIG. 10A, the speech voice (voice Sc) of the user C is input to the wireless microphone speaker device 2C and the wired microphone speaker device 3.

The voice Sc is input to the wireless microphone speaker device 2C without delay from utterance of the user C, and received by the voice processing device 1 at the time t2 after an elapse of 10 ms through transmission by wireless communication. On the other hand, the voice is input to the wired microphone speaker device 3 at the time t1 after an elapse of a transmission time (6 ms) during which the voice propagates in the air from utterance of the user C. In this case, similarly to the example in FIG. 8B, since the voice processing device 1 receives the voice Sc via the wired microphone speaker device 3 after 6 ms from utterance of the user C, and receives the voice Sc via the wireless microphone speaker device 2A after 10 ms from utterance of the user C, a difference in transmission time of 4 ms occurs.

Further, for example, when the user D utters in the environment illustrated in FIG. 10A, the speech voice (voice Sd) of the user D is input to the wireless microphone speaker device 2D and the wired microphone speaker device 3. In addition, the voice Sd is input to the wireless microphone speaker device 2D without delay from utterance of the user D, and received by the voice processing device 1 at the time t2 after an elapse of 10 ms through transmission by wireless communication. On the other hand, the voice is input to the wired microphone speaker device 3 at the time t3 after an elapse of a transmission time (12 ms) during which the voice propagates in the air from utterance of the user D. In this case, since the voice processing device 1 receives the voice Sd via the wired microphone speaker device 3 after 12 ms from utterance of the user D, and receives the voice Sd via the wireless microphone speaker device 2D after 10 ms (at the time t2) from utterance of the user D, a difference in transmission time of 2 ms occurs. Further, herein, a transmission time (spatial delay: 12 ms) when the voice Sd is received via the wired microphone speaker device 3 becomes longer than a transmission time (communication delay: 10 ms) when the voice Sd is received via the wireless microphone speaker device 2D.

Specifically, in the environment in FIG. 10A, a transmission time of the voice Sd uttered by the user D via the wired microphone speaker device 3 becomes longest. In this case, the adjustment processing unit 114 gives a delay time of 2 ms, as a delay time associated with each of the wired microphone speaker devices 2D and 2D, to the voices Sc and Sc input from the wired microphone speaker device 3, based on a difference with respect to a transmission time (12 ms) of the voice Sd, and gives a delay time of 6 ms to the voice Sc input from the wired microphone speaker device 3. In this way, when the wireless microphone speaker device 2 in which a communication delay becomes longer than a spatial delay, and the wireless microphone speaker device 2 in which a spatial delay becomes longer than a communication delay co-exist in the same space, the adjustment processing unit 114 gives a delay time to each of the voices input from the wireless microphone speaker device 2 and the wired microphone speaker device 3 in such a way that the voice matches a voice to be input at the latest time (the voice of the user D to be input to the wired microphone speaker device 3 in FIG. 10A).

When a delay time is set as described above, the voice processing unit 111 performs mixing processing on each voice Sc and each voice Sd at the time t6, for example, and outputs the processed voice. This enables to prevent deterioration of voice quality.

As described above, when the adjustment processing unit 114 adjusts a delay time with respect to the wireless microphone speaker device 2 and the wired microphone speaker device 3 in the same space, the delay time is registered in the delay information D1 (see FIG. 5).

Figure 11:
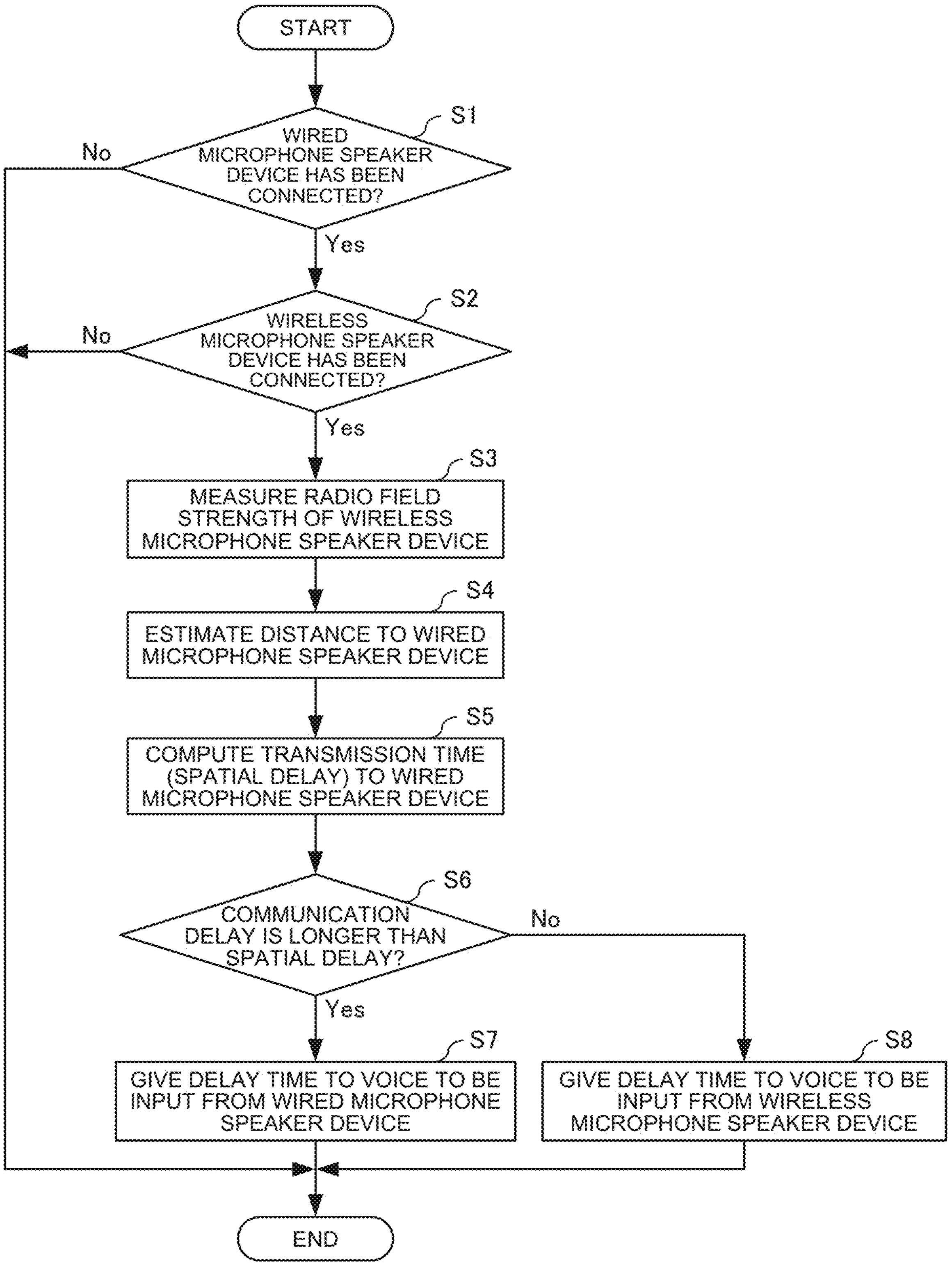
FIG. 11 is a flowchart illustrating an example of a procedure of voice control processing to be performed in the voice processing system according to the embodiment of the present disclosure.

Delay Adjustment Processing Hereinafter, an example of a procedure of delay adjustment processing to be performed by the controller 11 of the voice processing device 1 is described with reference to FIG. 11.

Note that, the present disclosure can be described as a delay adjustment method (a voice processing method according to the present disclosure) of executing one or more steps included in the delay adjustment processing. Further, one or more steps included in the delay adjustment processing described herein may be omitted as necessary. Further, the order of execution of each step in the delay adjustment processing may be different, as far as similar advantageous effects are generated. Furthermore, although a case is described herein as an example, in which the controller 11 executes each step in the delay adjustment processing, in another embodiment, one or more processing units may execute each step in the delay adjustment processing in a distributed manner.

First, in step S1, the controller 11 determines whether the wired microphone speaker device 3 is connected to the voice processing device 1. For example, the wired microphone speaker device 3 is connected to the voice processing device 1 by an audio cable, a USB cable, a wired LAN, or the like. When the controller 11 determines that the wired microphone speaker device 3 is connected to the voice processing device 1 (S1: Yes), the controller 11 shifts the processing to step S2. When it is determined that the wired microphone speaker device 3 is not connected to the voice processing device 1 (S1: No), the controller 11 finishes the processing.

In step S2, the controller 11 determines whether the wireless microphone speaker device 2 is connected to the voice processing device 1. For example, the wireless microphone speaker device 2 is connected to the voice processing device 1 by a wireless communication method such as Bluetooth. When the controller 11 determines that the wireless microphone speaker device 2 is connected to the voice processing device 1 (S2: Yes), the controller 11 shifts the processing to step S3. When it is determined that the wireless microphone speaker device 2 is not connected to the voice processing device 1 (S2: No), the controller 11 finishes the processing.

In step S3, the controller 11 measures a radio field intensity of the wireless microphone speaker device 2. When a plurality of wireless microphone speaker devices 2 are connected to the voice processing device 1, the controller 11 measures a radio field intensity of each wireless microphone speaker device 2. The controller 11 stores the measured radio field intensity in the delay information D1 (see FIG. 5). Further, the controller 11 measures the radio field intensity at a predetermined cycle, and updates the delay information D1.

Next, in step S4, the controller 11 estimates a distance from the wireless microphone speaker device 2 to the wired microphone speaker device 3. Specifically, the controller 11 estimates a distance between the wireless microphone speaker device 2 and the wired microphone speaker device 3, based on a radio field intensity of the wireless microphone speaker device 2.

Next, in step S5, the controller 11 computes a transmission time (spatial delay) until a voice is input to the wired microphone speaker device 3. For example, when a speed of sound is 340 m/s, and a time required for the sound to propagate in the air by 1 m is about 3 ms, the controller 11 computes a transmission time during which a voice propagates in the air from utterance of the voice until the voice is input to the wired microphone speaker device 3 by using the relational equation (distance×3 ms). Note that, a timing at which a voice is uttered may be a timing at which the voice is input to the wireless microphone speaker device 2.

In addition, the controller 11 acquires 40 ms (fixed value), as a transmission time (communication delay) until a voice input to the wireless microphone speaker device 2 is input to the voice processing device 1 by a Bluetooth communication method. In addition, the controller 11 may acquire 10 ms (fixed value), as a transmission time (communication delay) until a voice input to the wireless microphone speaker device 2 is input to the voice processing device 1 by another communication method. The controller 11 can determine a timing at which the voice is uttered by using the transmission time (communication delay).

Next, in step S6, the controller 11 determines whether the communication delay is longer than the spatial delay. When the controller 11 determines that the communication delay is longer than the spatial delay (S6: Yes), the controller 11 shifts the processing to step S7. On the other hand, when the controller 11 determines that the communication delay is shorter than the spatial delay (S6: No), the controller 11 shifts the processing to step S8.

In step S7, the controller 11 gives a delay time to the voice input from the wired microphone speaker device 3, and in step S8, the controller 11 gives a delay time to the voice input from the wireless microphone speaker device 2.

For example, as illustrated in FIG. 7A and FIG. 7B, when a transmission time (communication delay) "40 ms" from a time when a voice is input to the wireless microphone speaker device 2 until the voice is input to the voice processing device 1 is longer than a transmission time (spatial delay) "6 ms" and "12 ms" from a time when the voice propagates in the air until the voice is input to the wired microphone speaker device 3 (voice processing device 1), the controller 11 gives a delay time to the voice Sa input from the wired microphone speaker device 3 (step S7). In the example illustrated in FIG. 7B, the controller 11 gives a delay time of 34 ms, as a delay time associated with the wireless microphone speaker device 2A, to the voice Sa input from the wired microphone speaker device 3, and gives a delay time of 28 ms, as a delay time associated with the wireless microphone speaker device 2B, to the voice Sb input from the wired microphone speaker device 3.

For example, as illustrated in FIG. 9A and FIG. 9B, when a transmission time (communication delay) "10 ms" and "12 ms" from a time when a voice is input to the wireless microphone speaker device 2 until the voice is input to the voice processing device 1 is longer than a transmission time (spatial delay) "10 ms" from a time when the voice propagates in the air until the voice is input to the wired microphone speaker device 3 (voice processing device 1), the controller 11 gives a delay time to the voice input from the wireless microphone speaker device 2 (step S8). In the example illustrated in FIG. 9B, the controller 11 gives a delay time of 8 ms to each of the voices Sc and Sd input from the wireless microphone speaker devices 2C and 2D. Further, in the example illustrated in FIG. 9B, since the wireless microphone speaker devices 2C and 2D having a different distance are included, the controller 11 gives a delay time of 6 ms, as a delay time associated with the wireless microphone speaker device 2C, to the voice Sc input from the wired microphone speaker device 3.

After adjusting a delay time as described above, the controller 11 finishes the delay adjustment processing. When a meeting is started after the delay time is set, the controller 11 performs voice processing (such as mixing processing) on voices in the meeting, and transmits and receives voice data by using the delay time.

As described above, in the voice processing system 100 according to the present embodiment, the wireless microphone speaker device 2 capable of being carried by a user and wirelessly connected, and the wired microphone speaker device 3 that is wiredly connected are disposed in the same space, and the voice processing device 1 that processes a voice to be received from each of the wireless microphone speaker device 2 and the wired microphone speaker device 3 is included. Further, the voice processing system 100 computes a first transmission time (communication delay) when the first speech voice of the first user is input to the first wireless microphone speaker device 2 carried by the first user and received by the voice processing device 1, and a second transmission time (spatial delay) when the first speech voice of the first user is input to the wired microphone speaker device 3 and received by the voice processing device 1, and adjusts a delay time of at least either of the first wireless microphone speaker device 2 and the wired microphone speaker device 3, based on the computed first transmission time and second transmission time.

According to the above-described configuration, it is possible to match a delay (communication delay) of a voice by a connection method between the wireless microphone speaker device 2 and the wired microphone speaker device 3 to a delay (spatial delay) when the voice of the user of the wireless microphone speaker device 2 propagates in the air, is input to the wired microphone speaker device 3 by the microphone, and is received by the voice processing device 1. Therefore, voice quality can be improved. Further, adjusting the delay time in advance for a plurality of the wireless microphone speaker devices 2 and the wired microphone speaker device 3 disposed in the same space enables to reduce a processing load, because it is not necessary to adjust the delay time for each piece of equipment each time after conversation starts.

Other Embodiments

The present disclosure is not limited to the embodiment described above. Hereinafter, other embodiments of the present disclosure are described.

As another embodiment, the adjustment processing unit 114 may readjust a delay time when a radio field intensity of the wireless microphone speaker device 2 changes. For example, when the user wearing the wireless microphone speaker device 2 moves from the seat after a meeting is started, the distances from the wireless microphone speaker device 2 to the voice processing device 1 and the wired microphone speaker device 3 change, and the transmission time (spatial delay) of a voice changes. In view of the above, when a radio field intensity of the wireless microphone speaker device 2 in monitoring changes, the adjustment processing unit 114 estimates a distance between the wireless microphone speaker device 2 and the wired microphone speaker device 3, based on the radio field intensity, and readjusts the delay time by computing a transmission time (spatial delay), based on the estimated distance. This enables to prevent deterioration of voice quality by readjusting the delay time, even when the wireless microphone speaker device 2 moves. As still another embodiment, when a radio field intensity of the wireless microphone speaker device 2 falls below a threshold value, the adjustment processing unit 114 may stop adjustment processing of a delay time associated with the wireless microphone speaker device 2. For example, when the user wearing the wireless microphone speaker device 2 leaves a meeting room during a meeting, if the delay time is adjusted according to the distance after the movement of the wireless microphone speaker device 2, the delay time becomes unnecessarily long. In view of the above, when a radio field intensity of the wireless microphone speaker device 2 becomes less than a threshold value, the adjustment processing unit 114 presumes that the user of the wireless microphone speaker device 2 has left the meeting room, and excludes the user from the target of adjustment processing of the delay time. Note that, when the radio field intensity of the wireless microphone speaker device 2 recovers to the threshold value or more, the adjustment processing unit 114 presumes that the user of the wireless microphone speaker device 2 has returned to the meeting room, and adds the user to the target of adjustment processing of the delay time.

Further, as another embodiment, the adjustment processing unit 114 may further adjust the delay time, based on an outside air temperature. For example, the voice processing device 1 is equipped with a temperature sensor capable of acquiring an outside air temperature, and the adjustment processing unit 114 adjusts a correction value of the delay time according to a change in the outside air temperature measured by the temperature sensor. For example, when the outside air temperature rises by 1 degree, the speed of sound in the air increases by 0.6 m. Therefore, the adjustment processing unit 114 can adjust the delay time according to a change in the outside air temperature. This enables to adjust the delay time regardless of a change in the outside air temperature.

As another embodiment, the adjustment processing unit 114 may change settings on a delay amount by connection between the wireless microphone speaker device 2 and the wired microphone speaker device 3 according to a manual operation of the user. This enables to adjust a delay time with respect to the wired microphone speaker device 3 regardless of a connection method of the wireless microphone speaker device 2.

Note that, the voice processing system according to the present disclosure may be configured of the voice processing device 1 alone, or may be configured of combination of the voice processing device 1 and another server such as a meeting server.

Supplementary Note of Disclosure Hereinafter, an overview of the disclosure to be extracted from the above-described embodiment is added. Note that, each configuration and each processing function described in the following supplementary notes can be selected and optionally combined.

Supplementary Note 1

A voice processing system in which a wireless microphone speaker device capable of being carried by a user and wirelessly connected, and a wired microphone speaker device that is wiredly connected are disposed in a same space, the voice processing system including a voice processing device that processes a voice to be received from each of the wireless microphone speaker device and the wired microphone speaker device, the voice processing system including:

a computation processing circuit that computes a first transmission time when a first speech voice of a first user is input to a first wireless microphone speaker device carried by the first user and received by the voice processing device, and a second transmission time when the first speech voice of the first user is input to the wired microphone speaker device and received by the voice processing device; and an adjustment processing circuit that adjusts a delay time of at least either of the first wireless microphone speaker device and the wired microphone speaker device, based on the first transmission time and the second transmission time to be computed by the computation processing circuit.

Supplementary Note 2

The voice processing system according to supplementary note 1, wherein the computation processing circuit computes the first transmission time being a time from a time when the first speech voice is input to the first wireless microphone speaker device until predetermined voice processing is performed in the voice processing device, and computes the second transmission time being a time from a time when the first speech voice is input to the wired microphone speaker device until predetermined voice processing is performed in the voice processing device.

Supplementary Note 3

The voice processing system according to supplementary note 2, further including a measurement processing circuit that measures a distance between the first wireless microphone speaker device and the voice processing device, wherein the computation processing circuit estimates a distance between the first wireless microphone speaker device and the wired microphone speaker device, based on the distance to be measured by the measurement processing circuit, and computes the second transmission time, based on the estimated distance.

Supplementary Note 4

The voice processing system according to supplementary note 3, wherein the measurement processing circuit measures a distance between the first wireless microphone speaker device and the voice processing device, based on a radio field intensity of the first wireless microphone speaker device.

Supplementary Note 5

The voice processing system according to any one of supplementary notes 2 to 4, wherein the computation processing circuit computes, as the first transmission time, a fixed value set in advance by a wireless communication method.

Supplementary Note 6

The voice processing system according to any one of supplementary notes 1 to 5, wherein when the first transmission time is longer than the second transmission time, the adjustment processing circuit gives a delay time associated with a difference between the first transmission time and the second transmission time to the first speech voice to be input from the wired microphone speaker device, and when the second transmission time is longer than the first transmission time, the adjustment processing circuit gives a delay time associated with a difference between the first transmission time and the second transmission time to the first speech voice to be input from the first wireless microphone speaker device.

Supplementary Note 7

The voice processing system according to any one of supplementary notes 1 to 6, wherein when the first wireless microphone speaker device and the second wireless microphone speaker device having a different distance to the wired microphone speaker device from each other are disposed in a same space, the adjustment processing circuit gives a first delay time associated with the first wireless microphone speaker device, and a second delay time associated with the second wireless microphone speaker device to the first speech voice to be input from the wired microphone speaker device.

Supplementary Note 8

The voice processing system according to any one of supplementary notes 1 to 7, wherein the adjustment processing circuit readjusts a delay time, when a radio field intensity of the first wireless microphone speaker device changes.

Supplementary Note 9

The voice processing system according to any one of supplementary notes 1 to 8, wherein the adjustment processing circuit stops adjustment processing of a delay time associated with the first wireless microphone speaker device, when a radio field intensity of the first wireless microphone speaker device is lowered to a value less than a threshold value.

Supplementary Note 10

The voice processing system according to any one of supplementary notes 1 to 9, wherein the adjustment processing circuit further adjusts a delay time, based on an outside air temperature.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A voice processing system in which a first wireless microphone speaker device capable of being carried by a first user, a second wireless microphone speaker device capable of being carried by a second user, and a wired microphone speaker device are all disposed in a same space in an operational state, a first distance between the first wireless microphone speaker device and the wired microphone speaker device being different from a second distance between the second wireless microphone speaker device and the wired microphone speaker device, the voice processing system including a voice processing device that processes a voice to be received from each of the first wireless microphone speaker device, the second wireless microphone speaker device, and the wired microphone speaker device, wherein:

the voice processing system includes one or more processors, the one or more processors compute;

a first transmission time when a first speech voice of the first user is input to the first wireless microphone speaker device and is received by the voice processing device, a second transmission time when the first speech voice is input to the wired microphone speaker device and is received by the voice processing device, a third transmission time when a second speech voice of the second user is input to the second wireless microphone speaker device and is received by the voice processing device, and a fourth transmission time when the second speech voice is input to the wired microphone speaker device and is received by the voice processing device, and when the first transmission time is longer than the second transmission time and the third transmission time is longer than the fourth transmission time, the one or more processors:

give a first delay time to the first speech voice that is to be input from the wired microphone speaker device when the first speech voice is input to the first wireless microphone speaker device, give a second delay time, that is different from the first delay time, to the second speech voice that is to be input from the wired microphone speaker device when the second speech voice is input to the second wireless microphone speaker device, and give no delay time to the first speech voice that is to be input to the first wireless microphone speaker device and the second speech voice to be input to the second wireless microphone speaker device.

2. The voice processing system according to claim 1, wherein:

the first transmission time is from a time when the first speech voice is input to the first wireless microphone speaker device until predetermined voice processing is performed in the voice processing device, the second transmission time is from a time when the first speech voice is input to the wired microphone speaker device until the predetermined voice processing is performed in the voice processing device, the third transmission time is from a time when the second speech voice is input to the second wireless microphone speaker device until the predetermined voice processing is performed in the voice processing device, and the fourth transmission time is from a time when the second speech voice is input to the wired microphone speaker device until the predetermined voice processing is performed in the voice processing device.

3. The voice processing system according to claim 2, wherein the one or more processors:

measure a third distance between the first wireless microphone speaker device and the voice processing device and a fourth distance between the second wireless microphone speaker device and the voice processing device, estimate the first distance based on the third distance, compute the second transmission time based on the first distance, estimate the second distance based on the fourth distance, and compute the fourth transmission time based on the second distance.

4. The voice processing system according to claim 3, wherein the one or more processors:

measure the third distance based on a radio field intensity of the first wireless microphone speaker device, and measure the fourth distance based on a radio field intensity of the second wireless microphone speaker device.

5. The voice processing system according to claim 2, wherein the one or more processors set, in advance:

a first fixed value, as the first transmission time, by a wireless communication method, and a second fixed value, as the third transmission time, by the wireless communication method.

6. The voice processing system according to claim 1, wherein:

the first delay time is associated with a difference between the first transmission time and the second transmission time, and the second delay time is associated with a difference between the third transmission time and the fourth transmission time.

7. The voice processing system according to claim 4, wherein the one or more processors:

readjust the first delay time when the radio field intensity of the first wireless microphone speaker device changes, and readjust the second delay time when the radio field intensity of the second wireless microphone speaker device changes.

8. The voice processing system according to claim 4, wherein the one or more processors:

stop adjustment processing of the first delay time when the radio field intensity of the first wireless microphone speaker device is lower than a threshold value, and stop adjustment processing of the second delay time when the radio field intensity of the second wireless microphone speaker device is lower than the threshold value.

9. The voice processing system according to claim 1, wherein the one or more processors adjust the first delay time and the second delay time based on an outside air temperature.

10. A voice processing method performed by one or more processors included in a voice processing device in which a first wireless microphone speaker device capable of being carried by a first user, a second wireless microphone speaker device capable of being carried by a second user, and a wired microphone speaker device are all disposed in a same space in an operational state, a first distance between the first wireless microphone speaker device and the wired microphone speaker device being different from a second distance between the second wireless microphone speaker device and the wired microphone speaker device, the voice processing device processing a voice to be received from each of the first wireless microphone speaker device, the second wireless microphone speaker device, and the wired microphone speaker device, the voice processing method comprising:

computing:

a first transmission time when a first speech voice of the first user is input to the first wireless microphone speaker device and is received by the voice processing device, a second transmission time when the first speech voice is input to the wired microphone speaker device and is received by the voice processing device, a third transmission time when a second speech voice of the second user is input to the second wireless microphone speaker device and is received by the voice processing device, and a fourth transmission time when the second speech voice is input to the wired microphone speaker device and is received by the voice processing device; and when the first transmission time is longer than the second transmission time and the third transmission time is longer than the fourth transmission time:

giving a first delay time to the first speech voice that is to be input from the wired microphone speaker device when the first speech voice is input to the first wireless microphone speaker device;

giving a second delay time, that is different from the first delay time, to the second speech voice that is to be input from the wired microphone speaker device when the second speech voice is input to the second wireless microphone speaker device; and giving no delay time to the first speech voice that is to be input to the first wireless microphone speaker device and the second speech voice to be input to the second wireless microphone speaker device.

* * * * *